3,345,307
PROCESS FOR STABILIZING CATALYSTS SUPPORTED BY MAGNESIA OR BY MATERIALS CONTAINING THE SAME
Claude Paul and Samuel Pupko, Toulouse, France, assignors to Office National Industriel de l'Azote, Toulouse, France, a corporation of France
No Drawing. Filed May 7, 1964, Ser. No. 365,808
Claims priority, application France, May 21, 1963, 4,883
12 Claims. (Cl. 252—455)

ABSTRACT OF THE DISCLOSURE

The present disclosure relates to stabilization of a nickel catalyst on a magnesia support by mixing the magnesia with titania or alumina in stoichiometric proportions prior to contacting the support with the nickel catalyst. Whereas liquid hydrocarbon reforming catalysts normally become rapidly deactivated during the reforming operation, the addition of the titania or alumina to the magnesia support has been found to substantially inhibit such deactivation.

---

The catalysts that are generally used for reactions for converting gaseous or liquid hydrocarbons, in the presence of steam, carbon dioxide and/or oxygen, are the seat of the more or less rapid phenomena of deactivation chiefly resulting from the combination of active nickel with some oxides constituting the support.

Long ago, the exceptional qualities of magnesia supported catalysts or of catalysts supported by refractory materials with high magnesia content have been shown. Such contact masses, which are practically irreplaceable with respect to the processes of the cyclic conversion of hydrocarbons, in the presence of steam, exhibit a good catalytic activity, a considerable physical strength, and a high calorific capacity. Accordingly, the successive reactions of oxidation and reduction take place under highly favorable conditions, in contact with the active surface. Yet, it has been established that the same catalytic masses were "aging" as a function of time and that there was some analogy between the origins of that phenomenon and those elucidated in the French Patent 1,286,666 for the gradual deactivation of alumina supported catalysts.

Many experiments carried out in order to estimate the variation in the rate of the residual active nickel, in the course of an increasing number of successive oxidation and reduction cycles, have made it possible to come to the conclusion that a solid solution of mixed oxides of nickel and of magnesia is formed, which eventually contains other oxides. The complex formula thereof has not been clearly defined.

Thus, when a mixture containing 15% of NiO and 85% of MgO is calcined for 16 hours at 900° C. it is noted that its reducible nickel content has been decreased by 96%. A similar result is obtained, after 70 hours, with a mass consisting of 20% of NiO and 80% of MgO.

The principle of stabilizing alumina supported catalysts by means of admixing lime, which has been described in the French Patent 1,286,666, does not apply to magnesia supported catalysts, since the support thereof would be destroyed at high temperatures, and in the presence of carbon dioxide, as a result of the formation of calcium carbonate.

On the other hand, it has been found that incorporating titanium oxide and/or alumina to the magnesia materials used to make catalysts supports in accordance with the invention, imparts an exceptionally long service life to the active masses obtained from those materials. Furthermore, it has been noted that such catalysts, used for the continuous processes of reforming gaseous and/or liquid hydrocarbons, in the presence of steam, exhibit an excellent stability at all temperatures, without the catalyst-containing tubes being choked by the formation of carbon black deposits.

Catalyst supports, which have been stabilized in accordance with the present invention, are prepared from such definite combinations of magnesium as the aluminate, $Al_2O_3 \cdot MgO$, and/or the orthotitanate, $TiO_2 \cdot 2MgO$, and/or the metatitanate, $TiO_2 \cdot MgO$, obtained by mixing, in stoichiometric proportions, the constituent oxides. A thermal treatment is then carried out at the following temperatures: 1650°, 1200°, and 1100° C., respectively. Then, eventually, amounts of magnesium silicate selected as a function of the desired ultimate porosity and hardness are added to these mixed oxides. The support which has been prepared in such a manner is then soaked, once or several times, in succession, in a more or less concentrated solution of a decomposable nickel salt, then said support is dried and calcined by conventional methods.

Although this description is limited to nickel catalysts for hydrocarbon reforming reactions, the invention applies also to the contact masses obtained, in a general manner, by admixing with the supports, according to the invention, other metals such as cobalt, iron, platinum, etc. and used in other oxidation and/or reduction reactions.

In accordance with this invention, it is particularly important to use practically stoichiometric amounts of dry calcined magnesia, titanium oxide and/or alumina, with respect to the defined combinations selected for the constitution of the support. Experiments show that any appreciable excess of non-combined magnesia results in a corresponding decrease in activity, due to the formation of a mixed oxide, at the expense of the initially reducible nickel present in the catalyst.

The following examples are given merely for illustration and not for limitation, in order to show properly how the catalysts according to the invention may be prepared, and the advantages they have over known catalysts.

Example 1

A set of catalyst supports is prepared from homogenous mixtures of two moles of calcined magnesia and one mole of dry titanium oxide to which are added 0, 10, 20 and 30% of magnesium silicate, respectively. The mixtures thus obtained are mixed in the pasty phase, thereafter they are charged to an extrusion press and formed into small cylinders, which are dried and calcined at temperatures in the range of 1200° C. for several hours.

In the four supports thus obtained, between 90 and 94% of the titanium oxide are in combination with magnesia as the combination:

$$TiO_2 \cdot MgO$$

between 3 and 5% as the combination:

$$TiO_2 \cdot MgO$$

and between 3 and 5% of the initial magnesia are in the free state.

The volumetric porosity of the four samples ranging from 25 to 47% are soaked in an aqueous solution of nickel nitrate under such conditions that the obtained catalysts contain from 3.1 to 3.2% of active nickel after drying and calcination at 500° C.

The activity of each of the above-described catalysts is compared with that of a conventional contact mass obtained from magnesia alone and containing 3.1% of active nickel under a set of parallel test runs of cyclic reforming at 700° C., of a light gasoline in the presence of steam. Every elemental cycle comprises a phase of heating by combustion of gasoline, and a reforming phase, said phases being separated by a blow-off with steam. The thermal efficiency obtained with respect to the gasoline put into action is 86% and the gaseous mixture thus obtained, having closely related composition for the catalysts prepared in accordance with the invention, are different from the gaseous mixture obtained in the presence of the control catalyst, this one showing itself less active as early as the first month of operation. The analyses of the obtained gases have been tabulated in Table I.

After 5,000 hours of continuous operation the control and the stabilized catalysts were submitted to an analysis in order to determine the amount of the residual active nickel, in terms of percentage of the initial amount.

The data obtained, tabulated in Table II, show that the ultimate amount of active nickel, considered in every case as remaining practically constant against time, is higher as the rate of free magnesia is lower.

The analysis of the obtained gaseous mixtures has been tabulated in the following table:

| Absolute Pressure (kg./cm.$^2$) | Outlet Temp. of the Tubes (° C.) | Percent Volume Analysis of the Conversion Gas | | | |
|---|---|---|---|---|---|
| | | $CO_2$ | $H_2$ | CO | $CH_4$ |
| 1 | 725 | 15.82 | 72.15 | 11.78 | 0.25 |
| 6 | 730 | 16.2 | 70.5 | 11.0 | 2.3 |
| 20 | 730 | 17.2 | 66.4 | 9.4 | 7.0 |

It will be obvious to those skilled in the art that various changes may be made without departing from the spirit of the invention and therefore the invention is not limited to what is described in the specification, but only as indicated in the appended claims.

What is claimed is:

1. A process for obtaining stable metal catalysts for use in oxidation-reduction reactions in the presence of steam comprising preparing a catalyst support made of a mixed oxide obtained by mixing in the solid phase stoichiometric proportions of magnesia and at least one oxide of a metal selected from the group consisting of aluminum and titanium, adding magnesium silicate to the

TABLE I

| Catalyst | Percent Volume Composition of Gases | | | | | | | | | | Condensable Fraction (g./m.$^3$) |
|---|---|---|---|---|---|---|---|---|---|---|---|
| | $CO_2$ | $H_2$ | $N_2$ | CO | $CH_4$ | $C_2H_6$ | $C_2H_4$ | $C_3H_8$ | $C_3H_6$ | $C_4$ Hydrocarbons | |
| Stabilized Catalysts | 5.2 | 58.2 | 5.8 | 19.6 | 6.5 | 0.8 | 2.2 | 0.1 | 1.5 | 0 | 35 |
| Control | 5.8 | 52.2 | 7.9 | 16.0 | 7.8 | 2.0 | 4.6 | 0.3 | 2.4 | 1.0 | 74 |

TABLE II

| Catalyst | Support | | | | | Percent Active Nickel | |
|---|---|---|---|---|---|---|---|
| | Percent Composition (by weight) | | | Percent Magnesia | | Initial | Residual (in percent of initial active nickel) |
| | MgO | $TiO_2$ | $MgSiO_3$ | Combined | Free | | |
| Control | 97.0 | 0 | 0 | 0 | 100 | 3.1 | 7 |
| No. 1 | 50.2 | 49.8 | 0 | 94.8 | 5.2 | 3.18 | 78.2 |
| No. 2 | 45.2 | 44.8 | 10.0 | 95.1 | 4.9 | 3.12 | 81.5 |
| No. 3 | 40.16 | 39.84 | 20.0 | 96.0 | 4.0 | 3.22 | 84.6 |
| No. 4 | 35.14 | 34.86 | 30.0 | 96.4 | 3.6 | 3.14 | 85.0 |

*Example 2*

Soaking magnesia supports prepared without special care by immersing the same in aqueous solutions of decomposable nickel salts gives catalysts containing a limited amount of nickel. Their use in allothermic processes of continuous conversion of hydrocarbons, in the presence of steam, generally results in the formation of a carbon black deposit which quickly chokes up the catalyst tubes, particularly when the transformation is carried out under high pressures.

The above-described disadvantages disappear when the catalysts are used in accordance with the present invention wherein it is possible to incorporate amounts of active nickel up to 20% by weight.

The continuous reforming of a gasoline with steam, the ultimate distillation point thereof being 200° C., is effected in the presence of a catalyst, containing 12% of active nickel, the support thereof being identical to the support of the catalyst No. 4 of the preceding example. The transformation is carried out at temperatures ranging between 725 and 750° C. and pressures ranging between 1 and 20 kg./cm.$^2$, and the steam/carbon-of-the-gasoline ratio being 1:4. No formation of a carbon black deposit in the catalyst tubes is observed.

mixed oxide, and then impregnating the catalyst support with the metallic catalyst.

2. A process in accordance with claim 1 wherein the mixed oxide is obtained by heating at 1650° C. a mixture of equimolecular amounts of calcined magnesia and dehydrated alumina.

3. A process in accordance with claim 1 wherein the mixed oxide is obtained by heating at 1200° C. one mole of dry titanium oxide and two moles of calcined magnesia.

4. A process in accordance with claim 1 wherein the mixed oxide is obtained by heating at 1100° C. a mixture of equimolecular amounts of dry titanium oxide and of calcined magnesia.

5. A process in accordance with claim 1 wherein the metallic catalyst is selected from the group consisting of nickel, iron, platinum, and cobalt.

6. A stable catalyst for use in oxidation-reduction reactions in the presence of steam consisting essentially of a mixed oxide support obtained by mixing in the solid phase stoichiometric proportions of magnesia and at least one oxide of a metal selected from the group consisting of aluminum and titanium, and then adding magnesium silicate to the mixed oxide, said mixed oxide being impregnated by a metal selected from the group consisting of nickel, iron, platinum, and cobalt.

7. A stable catalyst in accordance with claim 6 wherein the mixed oxide is equimolecular amounts of magnesia and alumina.

8. A stable catalyst in accordance with claim 7 wherein the active metal is nickel.

9. A stable catalyst in accordance with claim 6 wherein the mixed oxide is one mole of titanium oxide and two moles of magnesia.

10. A stable catalyst in accordance with claim 9 wherein the active metal is nickel.

11. A stable catalyst in accordance with claim 6 wherein the mixed oxide is equimolecular amounts of titanium oxide and magnesia.

12. A stable catalyst in accordance with claim 11 wherein the active metal is nickel.

References Cited
UNITED STATES PATENTS

| | | | |
|---|---|---|---|
| 2,355,388 | 8/1944 | Michael et al. | 252—457 X |
| 2,356,576 | 8/1944 | Free et al. | 252—457 X |
| 2,406,929 | 9/1946 | Teter | 252—457 X |
| 3,186,797 | 6/1965 | Pearce et al. | 252—457 X |

DANIEL E. WYMAN, *Primary Examiner.*

C. F. DEES, *Assistant Examiner.*